United States Patent [19]
Nitzsche et al.

[11] 3,716,399
[45] Feb. 13, 1973

[54] WATER-REPELLENT COMPOSITION FOR TREATING BUILDING MATERIALS

[75] Inventors: Siegfried Nitzsche; Ewald Pirson; Michael Roth, all of Burghausen, Upper Bavaria, Germany

[73] Assignee: Wacker-Chemie G.m.b.H., Bavaria, Germany

[22] Filed: Dec. 3, 1970

[21] Appl. No.: 94,981

Related U.S. Application Data

[63] Continuation-in-part of Ser. No. 772,854, Nov. 1, 1968, abandoned.

[30] Foreign Application Priority Data

Nov. 3, 1967 Germany ..................... W 45102

[52] U.S. Cl. .........117/123 D, 260/18 S, 260/23 AR, 260/23 XA, 260/31.2 R, 260/32.8 SB, 260/33.4 SB, 260/33.6 SB, 260/33.8 SB, 260/827

[51] Int. Cl. .....................C04b 41/28, C08g 47/10
[58] Field of Search ..................260/827; 117/123 D

[56] References Cited

UNITED STATES PATENTS

| | | | |
|---|---|---|---|
| 2,982,674 | 5/1961 | Gancberg | 117/123 |
| 2,683,674 | 7/1954 | Hatcher et al. | 117/123 |
| 2,574,168 | 11/1951 | Brick | 117/123 |
| 2,850,473 | 9/1958 | Lewis et al. | 260/827 |
| 3,253,506 | 5/1966 | Marks et al. | 260/827 |
| 2,798,858 | 7/1957 | Brown | 260/827 |

*Primary Examiner*—Samuel H. Blech
*Attorney*—Robert F. Fleming, Jr., Laurence R. Hobey and Harry D. Dingman

[57] ABSTRACT

A mixture of methylpolysiloxanes and polymethylmethacrylate or vinylchloride copolymers in organic solvent is employed to impart water-repellency to masonry and gypsum-based building materials, inter alia.

7 Claims, No Drawings

WATER-REPELLENT COMPOSITION FOR TREATING BUILDING MATERIALS

This application is a continuation-in-part of application Ser. No. 772,854, filed Nov. 1, 1968, now abandoned.

This invention relates to the use of organic solvent solutions of mixtures of (1) certain resinous organosiloxanes and (2) polymethylmethacrylate or certain vinylchloride polymers as water-repellent agents on cementitious building materials, particularly on gypsum-based plasters and the like.

It is well known that organosilicon monomers and polymers can be employed on a wide variety of substrates to render the substrates water-repellent. The organosilicon material is applied to the substrate from aqueous system (emulsion, solution or dispersion) as well as from organic solvent systems. Surface treatments and admixture of the organosilicon material in the uncured building materials have been proposed.

It has been found that solutions of organopolysiloxanes, particularly methylpolysiloxanes in organic solvents, do not cause efflorescence in contrast to the aqueous solutions of alkali metal organosiliconates. Furthermore, the organopolysiloxanes in organic solvent solutions can be applied to previously treated surfaces and do not separate on the surface as do aqueous dispersions. The organic solvent system can disperse beneath the surface of the building material to give depth to the water-repellency and providing water-repellency even when the original surface has worn away or cracks and crevices appear in the surface. Repeated treatments also provide increased and/or continued water-repellency and durable water-repellency is achieved without loss of water vapor permeability using the organic solvent systems containing organopolysiloxanes. Finally, the presence of alkaline materials such as free calcium hydroxide in the substrate to be treated has little effect on the organopolysiloxanes employed in organic solvent systems.

By comparison to previously known methylsiloxane solutions used as impregnating material for rendering building water-repellent, the impregnating materials of the present invention have the advantage that a considerably greater degree of water-repellency can be achieved.

This invention introduces an impregnating material for rendering building materials water-repellent based on organic solvent solutions of mixtures of (1) methylpolysiloxanes and (2) 2 to 100 percent by weight calculated on the weight of the methylpolysiloxanes of polymethylmethacrylate or copolymers of vinylchloride which are soluble in lacquer solvents.

The methylpolysiloxanes which can be used within the framework of the present invention are those known and used in the form of organic solvent solutions as water-repellent impregnation for building materials. The methylpolysiloxanes most frequently used for this purpose and which are also preferred for the present invention can be represented by the general unit formula $(CH_3)_x Si(OR)_y O_{(4-x-y)/2}$. In this formula R is hydrogen and/or an alkyl radical with 1 to 4 carbon atoms, $x$ and $y$ are each 0, 1, 2 or 3, the sum of $x + y$ is not greater than 3, the average value of $x$ is 0.9 to 1.7, preferably 0.9 to 1.2 and the average value of $y$ is 0.01 to 0.20. Expediently, these organopolysiloxanes contain not more than 30 mole percent of siloxane units with more than 1 Si bonded methyl group per silicon atom and preferably they possess a viscosity not exceeding 1,000 cs./25° C. in 50 percent by weight toluene solution. Thus, they are polymers of $CH_3SiO_{3/2}$ units with less than 30 mole percent of $(CH_3)_2SiO$, $(CH_3)_3SiO_{1/2}$ and/or $SiO_{4/2}$ units present. The radicals represented by R include methyl, ethyl, propyl and butyl radicals but the ethyl radical is preferred because of commercial availability and low toxicity of such siloxanes.

Examples of vinylchloride copolymers, soluble in lacquer solvents, are the copolymers of vinylchloride with vinylidenechloride, vinyl esters of saturated aliphatic and cycloaliphatic monocarboxylic acids, acrylic acids, alkyl esters of olefinically unsaturated monocarboxylic acids such as acrylic acid esters, for example, methylacrylate, acrylonitrile, aliphatically unsaturated dicarboxylic acids, such as maleic acid or maleic acid anhydride and itaconic acid, the monomethyl ester of maleic acid and dimethyl ester of maleic acid and/or vinyl ethers such as vinylisobutyl ether. These copolymers preferably contain 50 to 95 percent by weight, especially 60 to 90 percent by weight of vinylchloride units. The preferred vinylchloride copolymers, soluble in lacquer solvent are those consisting of 60 to 90 parts by weight of vinylchloride and 10 to 40 parts by weight of vinyl acetate, especially those with an additional 5 to 15 percent by weight calculated on the weight of the vinyl acetate of a dicarboxylic acid such as maleic acid or itaconic acid. Such copolymers are commercially obtainable as is the polymethylmethacrylate. A further discussion of the vinylchloride polymers can be found in "Encyclopedia of Chemical Technology," Kirk-Othmer, Interscience Publishers, Volume 14, pages 723 et seq., (1955).

The best results are obtained when polymethylmethacrylate or vinylchloride copolymers, soluble in lacquer solvents, are used in quantities of 10 to 45 percent by weight calculated on the weight of the methyl polysiloxanes.

Examples of organic solvents are aliphatic hydrocarbons, such as alkanes with boiling points between 120° to 180° C. at atmospheric pressure; aromatic hydrocarbons, such as toluene, xylene and trimethyl benzene; chlorohydrocarbons such as trichloroethylene; alcohols, such as diacetone alcohol; ketones such as methyl ethyl ketone and esters such as ethyl acetate.

Mixtures of various solvents can be used. In order to obtain good penetration of primer materials into the building materials at high atmospheric temperatures, it is preferable to use solvents which evaporate at least five times as slowly as diethyl ether. For good penetration in water damp building materials, it is preferable to use solvents or at least as a component of the solvents, those which are miscible with water, such as isopropyl alcohol and diacetone alcohol.

The proportion of the total weight of the methylpolysiloxanes and the polymethylmethacrylate or the vinylchloride copolymers, in the organic solvent solutions is expediently 0.5 to 20 percent by weight preferably 3 to 8 percent by weight. This proportion increases within the above margins as the building materials become more absorptive.

If desired, curing catalysts sometimes incorporated in organopolysiloxane1based impregnating materials such as metal salts of carboxylic acids such as stannous octoate and zinc octoate and titanium and aluminum alcoholates can also be used for the impregnating materials of the present invention. The concurrent use of such catalyst is not required, however.

The impregnating materials of the present invention are especially suitable for impregnating structures of inorganic materials which will cure upon addition of water, having a pH value beneath 7.5 in an aqueous medium before curing. These structures include all of those based on gypsum. Structures based on gypsum which do not contain organopolysiloxanes either above or under their surface are especially water sensitive and water receptive and therefore the impregnating material of the present invention carries with it great advantages on gypsum. The effectiveness of the impregnating material of the present invention is also particularly unexpected on gypsum because gypsum contains no free calcium hydroxide whose possible deleterious effect on an organopolysiloxane impregnating material could be inhibited by the pure organic polymers. Among the different types of gypsum, there is plaster ($CaSO_{4.1/2}H_2O$) in the form of, for example, building plaster, stucco plaster and insulating plaster. If desired, the impregnating material of the present invention can be used on other types of plaster structures such as marble plaster, estrich plaster (Estrichgips), anhydrite and mixtures of plaster with hydrated lime. The gypsum can contain the usual well known additives.

The inorganic materials which will cure upon the addition of water and which have a pH value below 7.5 in aqueous medium before curing also include the bonding agents based on magnesium oxide and magnesium chloride such as Sorel's cement.

If desired, the impregnating material of the present invention can also be used on structures of other materials which will harden upon the addition of water such as lime (CaO or $Ca(OH)_2$), for example, lime coatings, Portland cement, concrete, asbestos cement, mortar stucco based on lime and sand as well as on other inorganic building materials such as natural stone and wall and roofing tile of fired clay.

The impregnating materials of the present invention can be applied to the surface of the building material to be impregnated in any desired manner such as by spraying, brushing, dipping and flowing.

Preferably, the impregnating materials of the present invention are applied in such quantities that about 5 to 30 grams of organopolysiloxane and pure organic polymer mixture are present per square meter of surface to be impregnated.

The following examples are illustrative of the invention and do not delineate the scope of the invention which is set forth in the claims.

EXAMPLE 1

A. 300 grams per square meter of a solution of 3.8 parts by weight of a methylsiloxane copolymer of monomethylsiloxane units and a minor proportion of dimethylsiloxane units, having the average unit formula $(CH_3)_{1.10}i(OC_2H_5)_{0.02}(OH)_{0.04}O_{2.84/2}$ and which has a viscosity of 40 to 60 cs./25° C., in 50 percent by weight toluene solution (12 sec. DIN-cup with an opening of 4 mm.) and 1.2 parts by weight of a polymethylmethacrylate (freezing temperature or buckling point: +80° C.) in 95 parts by weight toluene was applied to all surfaces of a 14 day old panel prepared by mixing 50 arts by weight of building gypsum (building gypsum is prepared by heating natural gypsum $CaSO_{4.2}H_2O$ to 180° to 700° C.) with 35 parts by weight of water (Panel 1 A).

B. For purposes of comparison, the above procedure was repeated with another gypsum panel as described with the alteration that instead of the solution of organopolysiloxane and polymethylmethacrylate, a solution of 5 parts by weight of the methylpolysiloxane in 95 parts by weight of toluene described under A. is used (Panel 1 B).

C. Also, for purposes of comparison, the above described procedure is repeated with the alteration that instead of the organopolysiloxane solution, a solution of 1.2 parts by weight of the polymethylmethacrylate described under A. in 98.8 parts by weight of toluene is used (Panel 1 C).

D. Also, for purposes of comparison, the procedure described under A. above is repeated with the alteration that 1.2 parts by weight of polybutylmethacrylate is used instead of 1.2 parts by weight of polymethylmethacrylate in the mixture of methyl polysiloxane and polymethacrylate (Panel 1 D).

E. Also, for purposes of comparison, the procedure described under C. above is repeated with the alteration that instead of 1.2 parts by weight polymethylmethacrylate, 1.2 parts by weight of polybutylmethacrylate is used (Panel 1 E).

Four days after carrying out the procedures A., B., C., D. and E., the panels as well as an untreated gypsum panel (control panel) are laid under water for 24 hours so that the water surface is 20 mm. above the panels. The panels are then removed from the water, and after dripping off, are weighed. The water absorption after this water storage, that is, the weight increase in percent, calculated on the weight of the dry panel, is given in the following Table 1.

TABLE 1

| Panel | water absorption in weight percent |
| --- | --- |
| 1 A | 2.08 |
| 1 B | 44.1 |
| 1 C | 36.55 |
| 1 D | 42.7 |
| 1 E | 45.65 |
| Untreated Control | 45.65[+) |

[+) After 20 minutes, it is already 41.4 percent by weight.

EXAMPLE 2

A. 200 grams per square meter of the solution described in Example 1 under A. was applied to all surfaces of a 24 day old concrete panel prepared from 1 part by weight of Portland cement PZ 275 (Cf. DIN-Specification 1164 of Dec. 1958, Paragraph 1), 1 part by weight of normal sand Kernel I (fine) (Cf. Citation DIN-Specification, Paragraph 8), 2 parts by weight of normal sand Kernel II (Coarse) (Cf. Cited DIN-Specification, Paragraph 8) and 0.6 parts by weight of water by brushing on once. (Panel 2 A).

B. For purposes of comparison, the above procedure was repeated with other concrete panels of the same type with the alteration that instead of the solution of organopolysiloxane and polymethylmethacrylate, a solution of the type described in Example 1 B. (Panel 2 B) and a solution of the type described in Example 1 C. (Panel 2 C) was used.

TABLE 2

| Panel | water absorption in percent by weight |
| --- | --- |
| 2 A | 0.9 |
| 2 B | 7.31 |
| 2 C | 6.05 |
| Untreated Control | 8.63 +) |

+)Has already absorbed 8.31 percent by weight of water after 60 minutes.

EXAMPLE 3

A. A 32 day old panel, prepared by mixing 50 parts by weight of building gypsum with 35 parts by weight of water dipped for 5 seconds in a solution of 115 parts by weight of the methyl polysiloxane described in Example 1 and 22.5 parts by weight of a copolymer of 84 percent by weight vinylchloride, 15 percent by weight vinyl acetate and 1 percent by weight of maleic acid in 1,033 parts by weight of toluene and 829 parts by weight of ethyl acetate (Panel 3 A).

B. For purposes of comparison, the above procedure was repeated with a gypsum plate of the type described above with the alteration that instead of the solution described under A., a 6.87 percent by weight solution of the methyl polysiloxane described in Example 1 in a mixture of 1 part by weight of toluene and 1 part by weight of ethyl acetate was used (Panel 3 B).

Four days after carrying out procedures 3 A and 3 B the water absorption of the panels was determined as described in Example 1. The results obtained are given in Table 3.

TABLE 3

| Panel | water absorption in percent by weight |
| --- | --- |
| 3 A | 9.82 |
| 3 B | 45.4 |

EXAMPLE 4

Results similar to those achieved in Example 3 A were achieved with solutions wherein the copolymer of vinylchloride-vinyl acetate-maleic acid was replaced by copolymers of 85 percent by weight vinylchloride and 15 percent by weight of any one or any mixture of vinylidene chloride, methylacrylate, methylmethacrylate, acrylonitrile, methyl maleate, dimethyl maleate, vinyl acetate, vinyl propionate, and vinylisobutyl ether.

That which is claimed is:

1. A method of rendering cementitious building materials water repellent which comprises impregnating the surface of inorganic cementitious building materials which are cured by addition of water thereto and have a pH value below 7.5 in an aqueous medium before curing with an organic solvent solution of (1) a methylpolysiloxane having the general unit formula $(CH_3)_x Si(OR)_y O_{(4-x-y)/2}$ where R is a hydrogen atom or an alkyl radical of one to four carbon atoms, $x$ and $y$ are each 0, 1, 2 or 3, the sum of $x + y$ is not greater than 3, the average value of $x$ is in the range of from 0.9 to 1.7 and the average value of $y$ is in the range from 0.01 to 0.20, mixed with (2) 2 to 100 percent by weight calculated on the weight of the methylpolysiloxane of polymethylmethacrylate or vinylchloride copolymers which are soluble in lacquer solvents and said vinylchloride copolymers are prepared by copolymerizing vinylchloride and a compound selected from vinylidenechloride, vinyl esters of saturated aliphatic and cycloaliphatic monocarboxylic acids, acrylic acids, alkyl esters of olefinically unsaturated monocarboxylic acids, aliphatically unsaturated dicarboxylic acids, mono- and dialkyl esters of olefinically unsaturated dicarboxylic acids or vinyl ethers, and thereafter allowing the surface to air dry.

2. The method of claim 1 wherein the polymethylmethacrylate or vinylchloride copolymer is present in amount of from 10 to 45 percent by weight on the stated basis.

3. The method of claim 1 wherein the cementitious building material is based on gypsum.

4. The method of rendering cementitious building materials water repellent which comprises impregnating the surface of cementitious building materials with an organic solvent solution of (1) a methylpolysiloxane having the general unit formula $(CH_3)_x Si(OR)_y O_{(4-x-y)/2}$ where R is a hydrogen atom or an alkyl radical of one to four carbon atoms, $x$ and $y$ are each 0, 1, 2 or 3, the sum of $x + y$ is not greater than 3, the average value of $x$ is in the range from 0.9 to 1.7, and the average value of $y$ is in the range from 0.01 to 0.20 admixed with (2) a vinylchloride copolymer with vinylidenechloride, vinyl esters of saturated aliphatic and cycloaliphatic monocarboxylic acids, acrylic acids, alkyl esters of olefinically unsaturated monocarboxylic acids, aliphatically unsaturated dicarboxylic acids, mono- and dialkyl esters of olefinically unsaturated dicarboxylic acids or vinyl ethers.

5. The method of claim 4 wherein the vinylchloride copolymer contains 60 to 90 percent by weight of vinylchloride.

6. The method of claim 4 wherein the methylpolysiloxane is mixed with a copolymer of 60 to 90 parts by weight vinylchloride and 10 to 40 parts by weight of vinyl acetate.

7. The method of claim 6 wherein the vinylchloride copolymer also contains 5 to 15 percent by weight based on the weight of vinyl acetate of a dicarboxylic acid.

* * * * *